No. 897,193. PATENTED AUG. 25, 1908.
A. M. CASPERSON.
APPARATUS FOR MEASURING LENGTHS OF FABRIC.
APPLICATION FILED MAY 6, 1907.
2 SHEETS—SHEET 1.
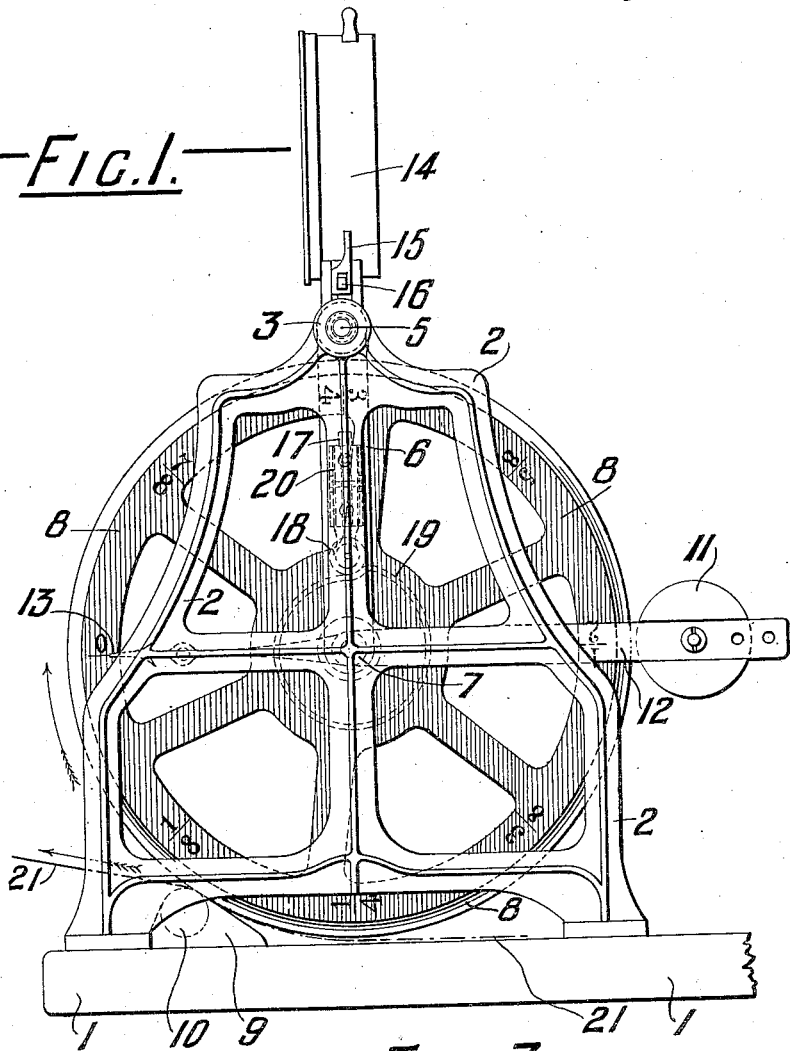
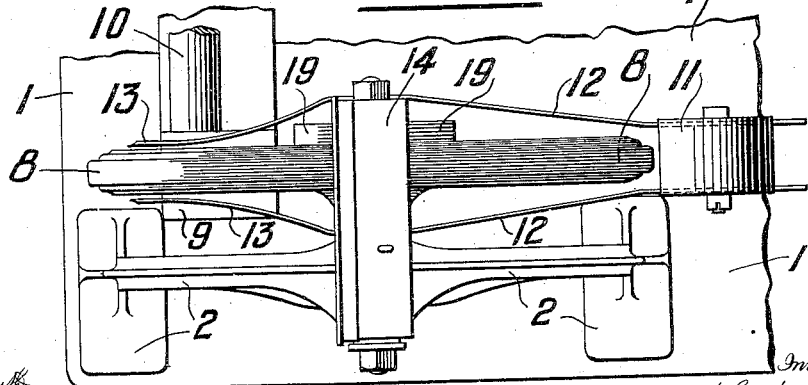

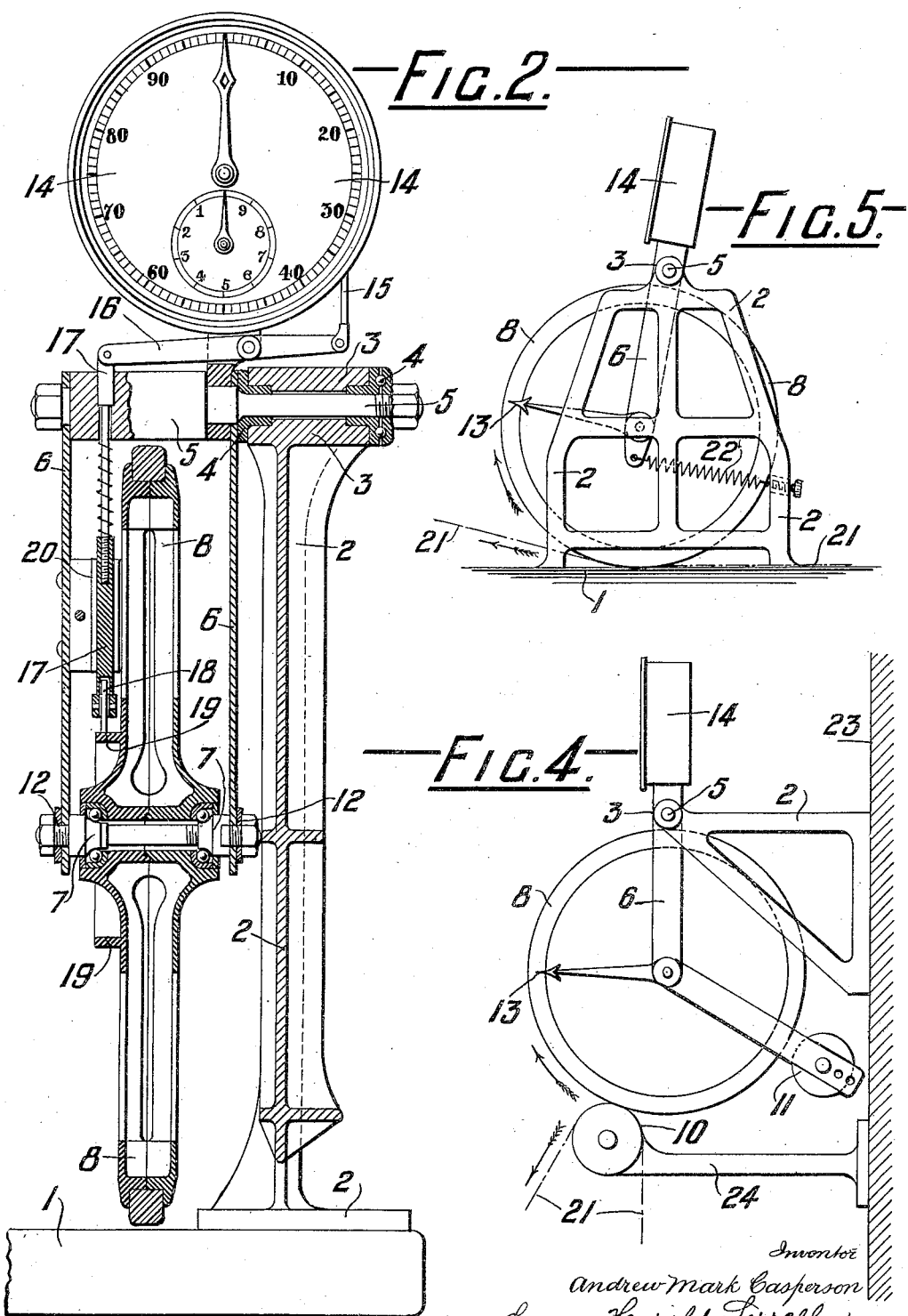

UNITED STATES PATENT OFFICE.

ANDREW MARK CASPERSON, OF LEEDS, ENGLAND.

APPARATUS FOR MEASURING LENGTHS OF FABRIC.

No. 897,193.   Specification of Letters Patent.   Patented Aug. 25, 1908.

Application filed May 6, 1907. Serial No. 371,956.

*To all whom it may concern:*

Be it known that I, ANDREW MARK CASPERSON, a subject of the King of Great Britain, residing at Leeds, in the county of York, England, have invented certain new and useful Improvements in Apparatus for Measuring Lengths of Fabric, and of which the following is a specification.

The present invention refers to an improved apparatus for measuring lengths of fabric, and is applicable for use in shops and other places where it is desired to accurately and speedily measure the lengths of such goods. In such apparatus it has already been proposed to provide a surface over which the cloth to be measured is drawn, and to provide a measuring wheel resting with its periphery upon the surface of the cloth, and the pivot or axis of the measuring wheel has been supported by links from a stationary framework, but in such known construction the links have been at such an angle to the vertical plane, that the weight of the measuring wheel at all times pressed upon the cloth. In another known construction it has been proposed to mount the axle of the measuring wheel so that the latter axle was capable of vertical motion, and then to provide a lever pivoted at one end to the framework and having an adjustable weight at the other end, and then having a link between the weight and the fulcrum connecting the lever to the axle of the measuring wheel, so that the pressure of the measuring wheel upon the cloth could be increased, in addition to the pressure due to the weight of the wheel itself. Now such constructions present some disadvantages in use, in that some fabric to be measured must not be subjected to too great a tension in being drawn beneath the roller, and consequently there are cases when the entire weight of the roller itself alone is not required to press upon the fabric; in other cases more than the pressure due to the weight of the roller is required, and the object of the present invention is to provide an improved construction and combination of parts as hereafter described and claimed, whereby the necessary and required pressure of the measuring wheel upon the fabric can be obtained.

Now according to the present invention I provide a rock shaft carried in bearings above the periphery of the measuring wheel, and this rock shaft carries suspension links which depend about vertically downwards, and at their lower ends have a bearing spindle upon which the measuring wheel is free to revolve, and means are provided whereby this freely suspended measuring wheel is swung over and held on to a stationary surface over which the fabric to be measured is passed, and such means are capable of adjustment whereby the pressure of the measuring wheel against the fabric passing over the said surface can be adjusted so that the said pressure of the measuring wheel can be made greater or less than the weight of the said measuring wheel.

Examples of the invention are illustrated in the accompanying drawings, whereon

Figures 1, 2 and 3 show in side elevation, vertical cross section, and plan view respectively, an arrangement where the links are suspended from a pivot vertically above the axis of the measuring wheel. Fig. 4 is a diagram view illustrating an arrangement similar to that shown at Figs. 1, 2 and 3, but in which the axes of the suspending links and of the roller against which the measuring wheel bears, are carried by wall brackets, and Fig. 5 is a diagram view illustrating an arrangement where the links are suspended from a point, so that they are in an angular position and allow the periphery of the wheel to bear upon the table.

Referring to Figs. 1, 2 and 3, 1 is a table having a bracket 2 fixed thereon, which bracket 2 is formed with a head 3 provided with bearings 4 carrying a rock shaft 5 having two suspension links 6 attached thereto, while between the suspension links 6 and on a horizontal bearing spindle 7 carried by the lower or free ends of the said links 6, is mounted a measuring wheel 8, which wheel 8 is free to revolve on its bearing spindle 7 and also capable of a swinging movement on its suspending bracket 2 through the medium of the suspension links 6 and revoluble shaft 5. On the table 1 and beneath the measuring wheel 8 is mounted a block 9 carrying a roller 10, over which block 9 and roller 10 the fabric to be measured is drawn, while an adjustable weight 11 carried on arms 12 fixed on the bearing spindle 7 normally retains the lower periphery of the measuring wheel 8 in contact with the surface of the block 9. The measuring wheel 8 is of a given circumference, say one meter or one yard, and division numbers indicating portions of a yard are marked on the side of the said wheel 8 as shown at Fig. 1, while the fingers 13 fixed on the bearing spindle 7 indicate the distance traveled by the wheel 8 and also act as pointers when bringing the said wheel 8 to zero. Over the measuring wheel 8 and on the revoluble shaft 5 is fixed a suitable counter 14, which latter is operated, so as to indicate the revolutions of the measuring wheel 8, by means of a rod 15 connected to one arm of a pivoted lever 16, the other arm of which is jointed to a vertically sliding spring-rod 17 having a runner 18 acted upon by a cam 19 located on one side of the measuring wheel 8; the rod 17 is guided vertically by a bracket 20 attached to one of the suspension links 6.

By swinging the measuring wheel 8 to the right, the fabric 21 to be measured is readily placed in position on the table 1 over the block 9 and roller 10, when, on lowering the said wheel 8 onto the fabric 21, the weight 11 normally retains the lower periphery of the wheel 8 in contact with the block 9 (see Fig. 1) bearing with a proper pressure thereon. The fabric 21 is now drawn forward by hand or otherwise in the direction indicated by an arrow, and this has the effect of rotating the measuring wheel 8 by frictional contact in the direction also indicated by an arrow, the number of revolutions made by the measuring wheel 8 indicating the length measured being simultaneously registered by the counter 14 operated through the medium of the cam 19, runner 18, rod 17, lever 16, and rod 15, while on the fabric 21 leaving the measuring wheel 8, the latter instantly comes to rest upon the block 9 so that a correct or accurate record is obtained.

In the arrangement shown by the diagram, Fig. 4, the suspension links 6 are carried from a bracket 2 which is fixed to a wall, and in this case both ends of the rock shaft or pivot 5 of the links are carried by the said bracket, and the fabric 21 is drawn directly over the roller 10 which is carried by arms 24 from the wall 23.

In the arrangement shown at Fig. 5, the roller 10 is dispensed with, and the suspension arms carrying the measuring wheel 8 are set at an angle to the vertical plane containing the axis of the measuring wheel, and so the lower part of the periphery of the measuring wheel 8 is brought directly onto the table 1 over the fabric 21, and the said wheel is normally maintained in that position by means of a light spring 22 instead of a weight, and the spring 22 can be adjusted in tension to vary the pressure of the roller upon the fabric.

What I claim as my invention and desire to secure by patent is:—

1. In apparatus for measuring lengths of fabric; the combination of a surface over which the fabric to be measured is passed, a stationary bracket, bearings in said bracket, a rock shaft carried in said bearings, suspension links depending about vertically downwards from said rock shaft, a bearing spindle carried at the lower ends of said suspension links, a measuring wheel revoluble about said bearing spindle, the said surface over which the fabric is passed being tangential to the said measuring wheel at its lower point, and means for holding the periphery of the measuring wheel against the fabric passing over said surface, the said means being adjustable to regulate the pressure of the said wheel on the said surface.

2. In apparatus for measuring lengths of fabric; the combination of a surface over which the fabric to be measured is passed, a stationary bracket, bearings in said bracket, a rock shaft carried in said bearings, suspension links depending about vertically downwards from said rock shaft, a bearing spindle carried at the lower ends of said suspension links, a measuring wheel revoluble about said bearing spindle, the said surface over which the fabric is passed being tangential to the said measuring wheel at its lower point, means for holding the periphery of the measuring wheel against the fabric passing over said surface, the said means being adjustable to regulate the pressure of the said wheel on the said surface and counting mechanism carried by said rock shaft to indicate the revolutions of the measuring wheel.

3. In apparatus for measuring lengths of fabric; the combination with a stationary bracket, bearings in said bracket, a rock shaft carried in said bearings, suspension links depending about vertically downwards from said rock shaft, a bearing spindle carried at the lower ends of said suspension links, a measuring wheel revoluble about said bearing spindle, counting mechanism of ordinary construction carried upon the rock shaft, and means for actuating the said counting mechanism; of a surface located forwardly of a vertical plane containing the axis of the measuring wheel and below said axis over which surface the cloth to be measured is passed, arms extending from the lower ends of the suspension links in a direction rearwardly of the vertical plane containing the axis of the measuring wheel, and an adjustable weight mounted on said arms for holding the periphery of the measuring wheel against said surface and for adjusting the pressure of said measuring wheel upon said surface.

4. In apparatus for measuring lengths of fabric; the combination with a measuring wheel, a pivot about which the measuring wheel is free to revolve, upwardly extending links fixed to said pivot, a rock shaft located vertically above the pivot of the measuring wheel, a stationary bracket, bearings in said bracket to carry said rock shaft to which latter the upper ends of the suspension links are fixed, a surface over which the cloth to be measured is passed, said surface being located forwardly of a vertical plane containing the axis of the measuring wheel and below said axis, arms extending rearwardly of said plane and horizontally from the suspending links, and a counter weight adjustably mounted on said arms to rock and hold the periphery of the measuring wheel into contact with said surface; of an index finger extending forwardly from said links to near the periphery of the wheel, and graduations on the wheel near said periphery, counting mechanism of ordinary construction carried upon the rock shaft, a rod for operating the counting mechanism, a two-armed lever, a pivot carried from the rock shaft to form a fulcrum for the two-armed lever, a pivot connecting the operating rod of the counting mechanism to one arm of said lever, a sliding rod extending towards the center of the measuring wheel, a pivot for connecting one end of said rod to the other arm of the two-armed lever, a guide on one of the suspension links for the sliding rod, a runner at the end of the sliding rod, and a cam surface located about the axis of the measuring wheel against which the runner bears for actuating the counting mechanism substantially as set forth.

In witness whereof I have hereunto set my hand in the presence of two witnesses.

ANDREW MARK CASPERSON.

Witnesses:
JOHN JOWETT,
VANCE E. GALLOWAY.